Figure 1:
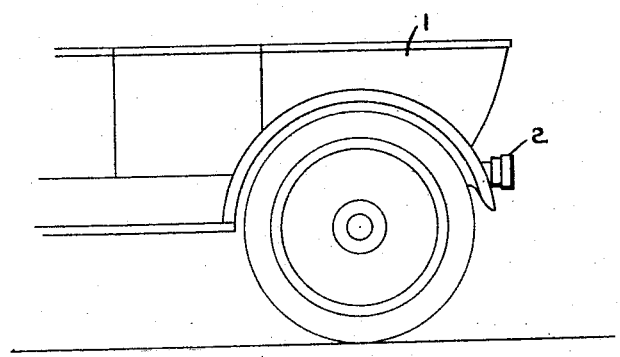

July 28, 1925.

H. P. J. EARNSHAW 1,547,307

COMBINED TAIL LIGHT AND SEARCHLIGHT FOR AUTOMOBILES

Filed Dec. 15, 1920

Inventor.
Henry P. J. Earnshaw
by Heard Smith & Tennant.
Attys.

Patented July 28, 1925.

1,547,307

UNITED STATES PATENT OFFICE.

HENRY P. J. EARNSHAW, OF NORTHBORO, MASSACHUSETTS.

COMBINED TAIL LIGHT AND SEARCHLIGHT FOR AUTOMOBILES.

Application filed December 15, 1920. Serial No. 430,844.

*To all whom it may concern:*

Be it known that I, HENRY P. J. EARNSHAW, a citizen of the United States, and resident of Northboro, county of Worcester, State of Massachusetts, have invented an Improvement in Combined Tail Lights and Searchlights for Automobiles, of which the following description, in connection with the accompanying drawing, is a specification, like characters on the drawing representing like parts.

This invention relates to a combined tail light and search light for automobiles and it has for its objects to provide a light of this character which is so constructed that the combination of the search light element with the tail light element does not involve any extra wiring.

Another object of the invention is to provide a novel combination tail light and search light which is constructed so that while the search light element is normally inoperative it can be readily rendered operative by connections leading to the instrument board of the car.

Other objects of the invention are to improve tail light and search light as will be more fully hereinafter set forth.

In order to give an understanding of my invention I have illustrated in the drawings a selected embodiment thereof which will now be described after which the novel features will be pointed out in the appended claim.

Fig. 1 on the drawings shows a portion of an automobile with my improved combined tail light and search light attached.

Figure 2:
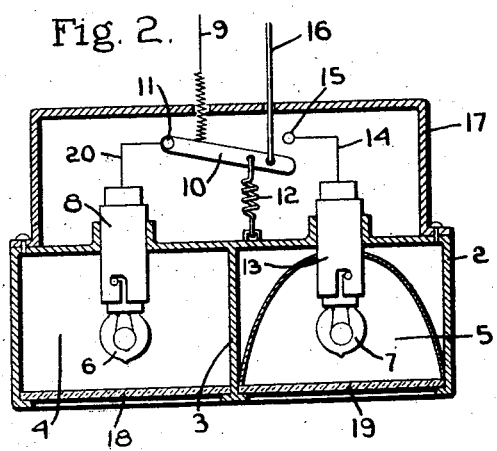

Fig. 2 is a horizontal section through the combined tail light and search light.

1 indicates an automobile and 2 the combined tail light and search light. This combined tail light and search light comprises a casing which is divided by a partition 3 into two compartments 4 and 5, one of which is adapted to receive the tail light 6 and the other the search light 7. The compartment 4 containing the tail light 6 is provided with a red glass 18 to give the usual red light. The compartment 5 containing the search light 7 will have a white glass 19. The tail light bulb 6 is secured in a socket 8 of usual construction and the search light bulb 7 is secured in a socket 13. The sockets herein illustrated are single contact sockets. The use of a single contact socket and bulb necessitates a single wire 9 leading from the battery to the socket because the socket is grounded on the frame and the frame acts as the return. I have provided herein a novel construction by which this single supply wire 9 leading from the battery may be used for supplying current not only to the tail light 6 but also, when required, to the search light bulb 7. I accomplish this by providing a switch element 10, herein shown as a pivoted switch which is pivoted at 11 and to which the wire 9 is connected, said switch being connected to the tail light socket 8 by means of a wire connection 20, the search light socket 13 is connected by a wire connection 14 to a fixed contact 15, which is situated to be engaged by the switch 10 when the latter is swung about its pivot. The said switch 10 is acted on by a spring 12 which normally holds it separated from the contact 15 but so that under normal conditions the circuit to the search light will be broken and the search will be inactive. The switch has a wire or other flexible connection 16 connected thereto which leads to the instrument board so that the operator of the car may manipulate the connection 16 to swing the switch 10 onto the contact 15 whenever it is desired to light the search light 7. The switch 10 and its connections will preferably be enclosed in a suitable housing 17 which forms part of the casing 2.

With this arrangement the search light will be normally inoperative but the tail light will function in the usual manner. Whenever the operator of the automobile desires to illuminate the road behind him, as for instance when it is necessary for him to back in the dark, then he will manipulate the connection 16 thereby closing the switch 10 onto the contact 15 and when this is done the circuit to the search light bulb 7 will be closed and the latter will be lighted. When the necessity for illuminating the area back of the automobile has ceased to exist then the operator will release the connection 16 and the spring 12 will automatically open the circuit to the search light. It will be noted that the addition of the search light does not involve any additional wiring from the battery as the search light is actuated from the lead wire 9 that extends to the tail light.

I claim.

In a combined tail light and search light for automobiles, the combination with a casing having three compartments, of a single-contact tail light in one compartment, a single-contact search light in another compartment, both lights being grounded on the casing, a single circuit wire leading from the battery to the tail light, a branch circuit in the third compartment of the casing connecting the search light with said circuit wire, said branch circuit having a normally open switch therein which is also located in said third compartment and manually-operable means for closing said switch.

In testimony whereof, I have signed my name to this specification.

HENRY P. J. EARNSHAW.